US011893632B2

(12) United States Patent
Virk et al.

(10) Patent No.: US 11,893,632 B2
(45) Date of Patent: Feb. 6, 2024

(54) SYSTEMS AND METHODS FOR DETERMINING FINANCIAL SECURITY RISKS USING SELF-SUPERVISED NATURAL LANGUAGE EXTRACTION

(71) Applicant: Capital One Services, LLC, McLean, VA (US)

(72) Inventors: Minnie Virk, Jersey City, NJ (US); Rohan Mehta, Brooklyn, NY (US); Alberto Silva, Brooklyn, NY (US); Anthony Shewnarain, Valley Stream, NY (US); Steven Freeman, Cranford, NJ (US); Stephen Jurcsek, Jersey City, NJ (US); Leah Lewy, Jersey City, NJ (US); Ross Arkin, Brooklyn, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/143,076

(22) Filed: Jan. 6, 2021

(65) Prior Publication Data

US 2022/0215467 A1 Jul. 7, 2022

(51) Int. Cl.
*G06Q 40/03* (2023.01)
*G06N 20/00* (2019.01)
(Continued)

(52) U.S. Cl.
CPC ........... *G06Q 40/03* (2023.01); *G06F 40/279* (2020.01); *G06N 20/00* (2019.01); *G06Q 20/382* (2013.01); *G06F 40/30* (2020.01)

(58) Field of Classification Search
CPC ..................................................... G06Q 40/25
(Continued)

(56) References Cited

U.S. PATENT DOCUMENTS 8,266,148 B2 9/2012 Guha
9,092,802 B1 7/2015 Akella
(Continued)

FOREIGN PATENT DOCUMENTS

WO WO-2021081516 A1 * 4/2021 ........... G06F 21/554

OTHER PUBLICATIONS

Authors et al: Alexander Kott: The Promises and Challenges of Continuous Monitoring and Risk Scoring; Published in: IEEE Security & Privacy ( vol. 11, Issue: 1, Jan.-Feb. 2013); pp. 90-93;Date of Publication: Feb. 1, 2013 (Year: 2013).*

(Continued)

*Primary Examiner* — Bruce I Ebersman
*Assistant Examiner* — Hatem M Ali
(74) *Attorney, Agent, or Firm* — TROUTMAN PEPPER HAMILTON SANDERS LLP; Christopher J. Forstner; John A. Morrissett (57) ABSTRACT

Systems and methods for dynamic detection of security features based on self-supervised natural language extraction from unstructured data sets are disclosed. The system may receive an unstructured data array including a full text of financial narrative. The system may serialize the unstructured data array to form one or more first data arrays including portions of the full text as discrete financial risk narratives. The system may build a tokenization dictionary and determine condensed summaries for each portion of the full text. The system may determine a relevancy score and a sentiment score for each condensed summary and calculate an overall relevancy score as a weighted average of the relevancy score and the sentiment score. When the overall risk score exceeds a predetermined threshold, the system may execute one or more security actions.

14 Claims, 7 Drawing Sheets

(51) Int. Cl.
*G06F 40/279* (2020.01)
*G06Q 20/38* (2012.01)
*G06F 40/30* (2020.01)

(58) Field of Classification Search
USPC .......................................................... 705/38
See application file for complete search history.

(56) References Cited

U.S. PATENT DOCUMENTS

| | | | |
|---|---|---|---|
| 9,535,902 B1 | 1/2017 | Michalak et al. | |
| 10,042,923 B2 | 8/2018 | Markman | |
| 10,198,766 B1* | 2/2019 | Dharmadhikari | G06F 17/00 |
| 10,614,196 B2 | 4/2020 | Maitra et al. | |
| 2018/0082183 A1* | 3/2018 | Hertz | G06N 5/02 |
| 2019/0370391 A1 | 12/2019 | Ezen Can et al. | |
| 2022/0084371 A1* | 3/2022 | Semichev | H04L 63/0892 |

OTHER PUBLICATIONS

Author: Kodey S. Crandall: Risk Assessments: A Weighted Score Approach to Improving Risk Management Decisions: Xplore IEEE: Date of Conference: Oct. 2-3, 2020: Date Added to IEEE Xplore: Nov. 11, 2020: (Year: 2020).*

Authors: Serrano et al.; Title: Privacy risk analysis in the IoT domain; IEEE Xplore; Publication Date: Jun. 1, 2018; Conference End Date: Jun. 7, 2018; (Year: 2018).*

Authors: Capra et al.; Title: Hardware and Software Optimizations for Accelerating Deep Neural Networks: Survey of Current Trends, Challenges, and the Road Ahead; IEEE Xplore; Publication Date: Jan. 1, 2020; (Year: 2020).*

1. Authors: Serrano et al.; Title: Privacy risk analysis in the IoT domain; IEEE Xplore; Publication Date: Jun. 1, 2018; Conference End Date: Jun. 7, 2018; (Year: 2018) (Year: 2018).*

2.Authors: Capra et al.; Title: Hardware and Software Optimizations for Accelerating Deep Neural Networks: Survey of Current Trends, Challenges, and the Road Ahead; IEEE Xplore; Publication Date: Jan. 1, 2020; (Year: 2020) (Year: 2020).*

* cited by examiner

SYSTEMS AND METHODS FOR DETERMINING FINANCIAL SECURITY RISKS USING SELF-SUPERVISED NATURAL LANGUAGE EXTRACTION

FIELD

The presently disclosed subject matter relates generally to assessing financial risk based on a self-supervised natural language extraction from an unstructured data set, more particularly, to systems and methods that determine a condensed financial risk narrative based on self-supervised natural language extraction from an unstructured data set and determining a security score indicative of a financial risk for a user associated with the condensed financial risk narrative.

BACKGROUND

Traditionally, financial service providers deciding whether to extend a loan package, cancel a loan package, or make an alteration to an existing loan package must first manually analyze a long form financial narrative in order to determine a financial risk associated with a respective user or customer to which the loan has been provided. For instance, most financial service providers undergo a manual summarization process in which long form financial narratives are manually summarized to create an annual review for a respective customer that is used to determine whether a loan package will be extended, canceled, or amended based on the respective risk profile determined from the annual review summary. Existing methods of determining financial risk based on a long form financial risk narrative is costly and time consuming, because the process is almost entirely manual.

Accordingly, a need exists for a self-supervised method of converting long form financial risk narratives into condensed financial risk narratives and autonomously determining users having a heightened financial risk profile. There also exists a need for systems and methods that can autonomously convert long form financial risk narratives into condensed financial risk narratives to use in place of a traditional annual review summary, as well as systems and methods for verifying and improving the quality of the generated condensed financial risk narratives.

SUMMARY

Aspects of the disclosed technology include system and methods for dynamic detection of security features based on self-supervised natural language extraction from unstructured data sets. For example, the unstructured data sets may include data indicative of a long form financial risk narrative for a respective customer of user of the system. The system may utilize natural language processing algorithms to autonomously determine a self-tokenization library and generate condensed financial risk narratives based on the unstructured data sets. Each condensed financial risk narrative may be associated with a discrete user event indicative of a financial asset narrative and/or a financial liabilities narrative. The system may determine a security score for each of the condensed financial risk narratives, which may indicate a relative financial risk profile for a respective user. When the security score of any discrete user event exceeds a predetermined threshold, the system may execute one or more security actions. In some embodiments, the system may autonomously generate a financial annual review summary based on self-supervised natural language extraction from a long form financial risk narrative.

In some embodiments, the system may iteratively improve the quality and accuracy of the generated annual review summaries and/or condensed financial risk narratives by using machine learning methods to reconstruct the full text of the long form financial risk narrative based on the condensed financial risk narrative and iteratively minimize an error associated with the reconstruction by adjusting one or more weights of one or more layers of a neural network configured to perform methods in accordance with certain embodiments of the disclosed technology.

In some embodiments, the system may iteratively improve the quality of the generated annual review summaries and/or condensed financial risk narratives based on receiving one or more training summaries, associating each of the one or more training summaries to one or more condensed summaries based on an identifier, and refining the natural language processing algorithm based on comparing each condensed summaries to its respective training summary.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings.

DETAILED DESCRIPTION

Some implementations of the disclosed technology will be described more fully with reference to the accompanying drawings. This disclosed technology, however, may be embodied in many different forms and should not be construed as limited to the implementations set forth herein. The components described hereinafter as making up various elements of the disclosed technology are intended to be illustrative and not restrictive. Many suitable components that could perform the same or similar functions as components described herein are intended to be embraced within the scope of the disclosed systems and methods. Such other components not described herein may include, but are not limited to, for example, components developed after development of the disclosed technology.

It is also to be understood that the mention of one or more method steps does not imply a particular order of operation or preclude the presence of additional method steps or intervening method steps between those steps expressly identified. Similarly, it is also to be understood that the mention of one or more components in a device or system does not preclude the presence of additional components or intervening components between those components expressly identified.

According to certain example implementations of the disclosed technology, systems and methods are disclosed herein for dynamic detection of security features based on self-supervised natural language extraction from unstructured data sets representative of financial profile narratives including financial assets and liabilities comprising a financial profile for a respective user. For example, in one aspect, a system is provided for autonomously receiving an unstructured data arrays representative of a financial profile and utilizing natural language processing (NLP) methods to determine a tokenization library and generate a condensed narrative for the financial profile in a second data array. Thus, according to some embodiments, the disclosed technology may provide a system configured to continually improve its ability to autonomously determine condensed financial risk narratives based on a full-text corpus (e.g., input stream) of a financial profile, which has been challenging for existing systems and methods. According to some embodiments, each unstructured data array may be indicative of a plurality of discrete user events. Each discrete user event may be associated with a financial asset or a financial liability included in a financial profile of a respective user.

In some embodiments, the system may implement a neural network in order to generate the condensed financial risk narratives. The system may attempt to autonomously adjust and revise the condensed financial risk narratives in a self-supervised learning process. For example, the system may be configured to attempt reconstruction the full text corpus of the financial profile based on the generated condensed financial risk narrative and minimize an error associated with the reconstruction. By iteratively repeating the process of generating a condensed summary and reconstructing the full text corpus of the financial profile, the system may adjust weights associated with each connected layer of the neural network. In some embodiments, the neural network may be a bidirectional recurrent neural network (RNN).

The neural network may include a plurality of neural network layers, which act to emulate a human neural network in order to learn a specific task or tasks. A neural network may connect two hidden layers of opposite directions to the same output. This allows a neural network model to receive context information from past states and future states simultaneously during training, improving quality of vectors representative of the condensed financial risk summary. In some embodiments the neural network model may be combined with a mechanism to improve the ability of the model to create contextual connection between words in a financial profile that are distant in the input language sequence. For example, the mechanism may comprise an attention mechanism that is combined with an input to the neural network, allowing the neural network to focus on certain parts of the input sequence when predicting other parts of the output sequence, which may enable superior self-supervised learning of the model. In other embodiments, the mechanism may comprise one of a long short-term memory mechanism (LSTM) and/or a gated recurrent unit (GRU). In some embodiments, a GRU may be implemented in tandem with an attention mechanism to improve to bidirectional RNN model, while in other embodiments, a LSTM may be implemented in tandem with an attention mechanism to improve the bidirectional RNN model. In a preferred embodiment, the mechanism is preferably an attention mechanism.

In some embodiments, the tokenization library may be determined by first determining a vector representation and correlation value between each data entry pair (e.g., representative of a word to word correlation among the words of the input text) in the unstructured data array, and generate a value for each data entry (e.g., each word) based on the vector representations and correlation values. Based on the generated value for each data entry, the system may select a plurality of highest value data entries to construct a condensed financial risk summary from an unstructured data array representative of a full text corpus of a financial profile. For example, the system may implement a pretrained BERT NLP language model, ELMO NLP language model, and/or GLOVE NLP language model in tandem with a self-supervised learning neural network to generate a condensed financial risk narrative and determine an overall relevancy and sentiment score for each discrete user event described by the condensed financial risk summary.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
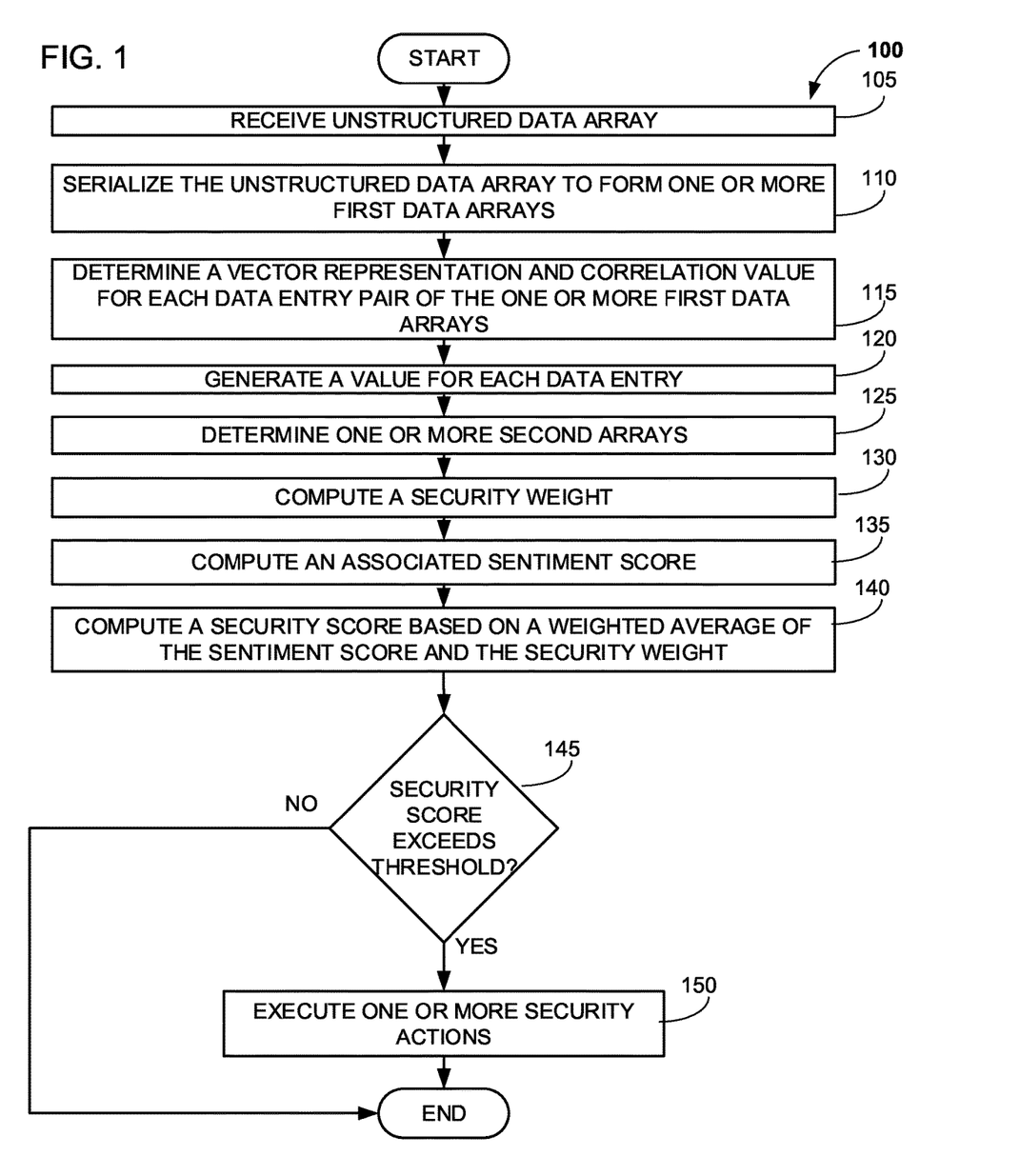
FIG. 1 is a flowchart of an exemplary method of dynamic detection of security features based on self-supervised natural language extraction from unstructured data sets, in accordance with some embodiments.

FIG. 1 is a flow chart of a method of dynamic detection of security features based on self-supervised natural language extraction from unstructured data sets, in accordance with some examples of the present disclosure. Although steps in method 100 are described as being performed by the system (e.g., system 500 as described in more detail with respect to FIGS. 5-6), a person of ordinary skill in the art would understand that some or all of the steps of method 100 may be performed by one or more devices of the system (e.g., security assessment module 510, as described in more detail with respect to FIGS. 5-6). As shown in FIG. 1, in step 105 of method 100, the system (e.g., system 500) may receive an unstructured data array. The unstructured data array may contain a financial profile for a respective user. The financial profile may include a long form financial narrative that includes discrete user events associated with financial assets and financial liabilities that a financial service provider may need to analyze to determine a security score (e.g., a risk profile) associated with the user. In some embodiments, the financial narrative may include a full-text corpus indicative of one or more financial assets narratives and one or more financial liabilities narratives associated with the user. In step 110, the system may serialize the unstructured data array to form one or more first data arrays.

For example, the system (e.g., security assessment module 510) may identify at least one indicator and use the at least one indicator to form the one or more first data arrays. For example, the at least one indicator may include a timestamp associated with portions of the unstructured data array that allow the system to discretize the unstructured data array into the one or more first data arrays according to the associated timestamps. In some embodiments, the at least one indicator may identify a particular category or subset of financial transactions to be paired together in one of the one or more first data arrays. Each of the one or more first data arrays may be indicative of a discrete user event and may include a plurality of data entries. In some embodiments, each data entry may include a word from the narrative associated with the discrete user event. In some embodiments, each discrete user event is associated with at least one of a financial liabilities narrative and a financial assets narrative. In step 115, the system may determine a vector representation and correlation value for each data entry pair of the one or more first data arrays. For example, a self-supervised learning neural network may be employed by the system (e.g., security assessment module 510) to determine which data entry pairs are most highly correlated by representing word-to-word correlations in vector form. In step 120, the system may generate a value for each data entry of the one or more first data arrays based on the determined vector representations and correlation values for each data entry pair of one or more first data arrays. In some embodiments, generating a value for each data entry of the one or more first data arrays may include determining which words of the input text of the financial narrative associated with the respective discrete user event convey the main theme or outcome of the discrete user event such that the system may determine which words to include in a condensed financial risk narrative. In step 125, the system may determine one or more second data arrays based on selecting a plurality of highest value data entries from the one or more first data arrays. In some embodiments, selecting the plurality of highest value data entries may further include generating the condensed financial risk narrative associated with each respective discrete user event represented by the one or more first data arrays. The condensed financial risk narratives may be stored as one or more second data arrays and each of the one or more second data arrays may be representative of a respective condensed financial risk narrative associated with a discrete user event. In step 130, the system may determine for each discrete user event a security weight and in step 135, the system may determine an associated sentiment score. For example, the security weight may be indicative of the relative risk associated with a respective discrete user event. The security weight may be determined based on how impactful a respective condensed financial risk narrative is to an overall risk assessment for a respective user. The sentiment score may indicate whether the impact of the respective discrete user event is positive or negative (e.g., whether the discrete user event positively impacts a respective user's financial risk profile or negatively impacts the user's financial risk profile). In step 140, the system may compute a security score based on a weighted average of the sentiment score and the security weight. For example, the security weight may be a number between 0 and 100 and the sentiment score may be a number ranging from −1 to 1. Accordingly, a security weight of 100 indicates that a respective discrete user event is highly likely to impact a user's financial risk profile, and a security weight of 0 indicates that the discrete user event is highly unlikely to impact the financial risk profile. A sentiment score of −1 indicates the discrete user event has a strong negative impact, whereas a sentiment score of +1 indicates a strong positive impact, with values in between indicative of relatively less strong negative and/or positive impact, respectively. A sentiment score of 0 may indicate a neutral impact or no impact on a user's financial risk profile. In decision block 145, the system may verify whether the determined security score exceeds a predetermined threshold. When the security score exceeds the predetermined threshold, the system may execute one or more security actions in step 150. According to some embodiments, the one or more security actions may include an action selected from flagging a user account for external review, generating a suggestion to lower a credit rating associated with the user account, and generating a suggestion for offering an alternative loan package. In some embodiments, the one or more security actions may include identifying whether market conditions have changed such that additional external review is not needed (e.g., when market conditions indicate that the predetermined threshold associated with the security score should be adjusted upwards, requiring a higher security score before one or more security actions are taken). In some embodiments, the one or more security actions may include identifying and reviewing at least one financial metric associated with the user account.

Figure 2:
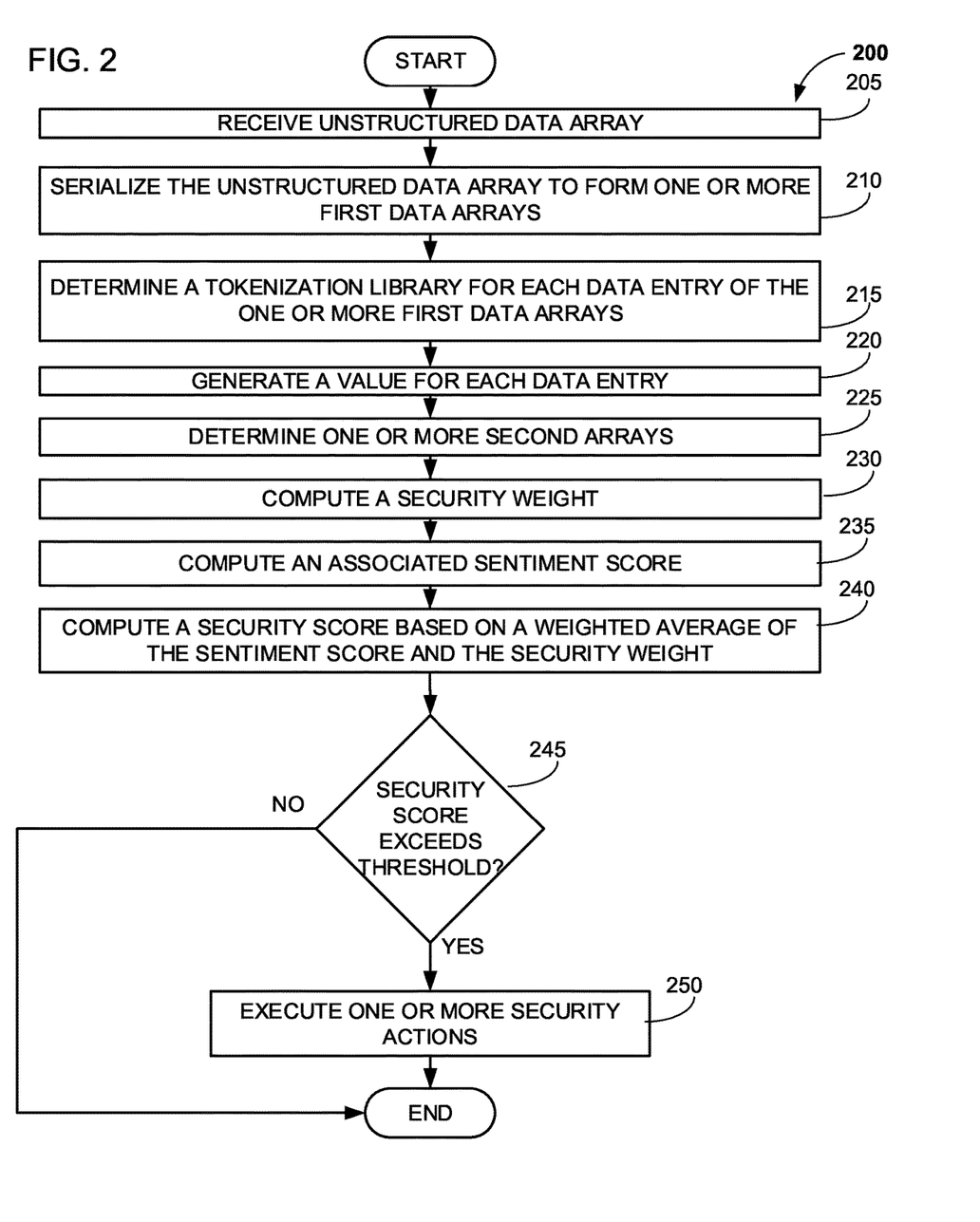
FIG. 2 is a flowchart of another exemplary method of dynamic detection of security features based on self-supervised natural language extraction from unstructured data sets, in accordance with some embodiments.

FIG. 2 is a flowchart of another exemplary method of dynamic detection of security features based on self-supervised natural language extraction from unstructured data sets, in accordance with some embodiments. As shown in FIG. 2, in step 205 of method 200, the system may receive an unstructured data array. As described with respect to FIG. 1, the unstructured data array may contain a financial profile for a respective user. The financial profile may include a long form financial narrative that includes discrete user events associated with financial assets and financial liabilities that a financial service provider may need to analyze to determine a security score (e.g., a risk profile) associated with the user. In some embodiments, the financial narrative may include a full-text corpus indicative of one or more financial assets narratives and one or more financial liabilities narratives associated with the user. In step 210, the system may serialize the unstructured data array to form one or more first data arrays. The process for serializing the unstructured data arrays into one or more first data arrays may be similar to the process described with respect to FIG. 1 and may be based on at least one indicator by which the system may identify portions of the input stream of data that correspond to each of the one or more discrete user events represented by the long form narrative. As described in more detail with respect to FIG. 1, each of the first data arrays may include a plurality of data entries. In some embodiments, each data entry may include a word from the narrative associated with the discrete user event. In step 215, the system may determine a tokenization library for each data entry of the one or more first data arrays. For example, the tokenization library may be developed in a self-supervised fashion by system 500. In some embodiments, the tokenization library may be developed based on the utilization of one or more pre-trained natural language classifiers, such as a BERT NLP language model, ELMO NLP language model, and/or GLOVE NLP language model. In some embodiments, these NLP models may be used in tandem with a self-supervised learning neural network to generate the tokenization library. The tokenization library may include vectorized representations of each word of the financial narrative that allows the system to determine correlations among pairs of words and to determine an overall pertinence of each word of the narrative to the financial risk profile of a respective user. In step 220, the system may generate a value for each data entry of the one or more first data arrays based on the determined tokenization library for each data entry of the one or more first data arrays. In some embodiments, generating a value for each data entry of the one or more first data arrays may include determining which words of the input text of the financial narrative associated with the respective discrete user event convey the main theme or outcome of the discrete user event such that the system may determine which words to include in a condensed financial risk narrative. In step 225, the system may determine one or more second data arrays based on selecting a plurality of highest value data entries from the one or more first data arrays. In some embodiments, selecting the plurality of highest value data entries may further include generating the condensed financial risk narrative associated with each respective discrete user event represented by the one or more first data arrays. The condensed financial risk narratives may be stored as one or more second data arrays and each of the one or more second data arrays may be representative of a respective condensed financial risk narrative associated with a discrete user event. In step 230, the system may compute for each discrete user event a security weight and in step 235, the system may compute an associated sentiment score. As described in more detail with respect to FIG. 1, the security weight may be determined based on how impactful a respective condensed financial risk narrative is to an overall risk assessment for a respective user and the sentiment score may indicate whether the impact of the respective discrete user event positively or negatively impacts a respective user's financial risk profile. In step 240, the system may compute a security score based on a weighted average of the sentiment score and the security weight. For example, the security weight may be a number between 0 and 100 and the sentiment score may be a number ranging from −1 to 1. Accordingly, a security weight of 100 indicates that a respective discrete user event is highly likely to impact a user's financial risk profile, and a security weight of 0 indicates that the discrete user event is highly unlikely to impact the financial risk profile. A sentiment score of −1 indicates the discrete user event has a strong negative impact, whereas a sentiment score of +1 indicates a strong positive impact, with values in between indicative of relatively less strong negative and/or positive impact, respectively. A sentiment score of 0 may indicate a neutral impact or no impact on a user's financial risk profile. In decision block 245, the system may verify whether the determined security score exceeds a predetermined threshold. When the security score exceeds the predetermined threshold, the system may execute one or more security actions in step 250. According to some embodiments, the one or more security actions may include an action selected from flagging a user account for external review, generating a suggestion to lower a credit rating associated with the user account, and generating a suggestion for offering an alternative loan package.

Figure 3:
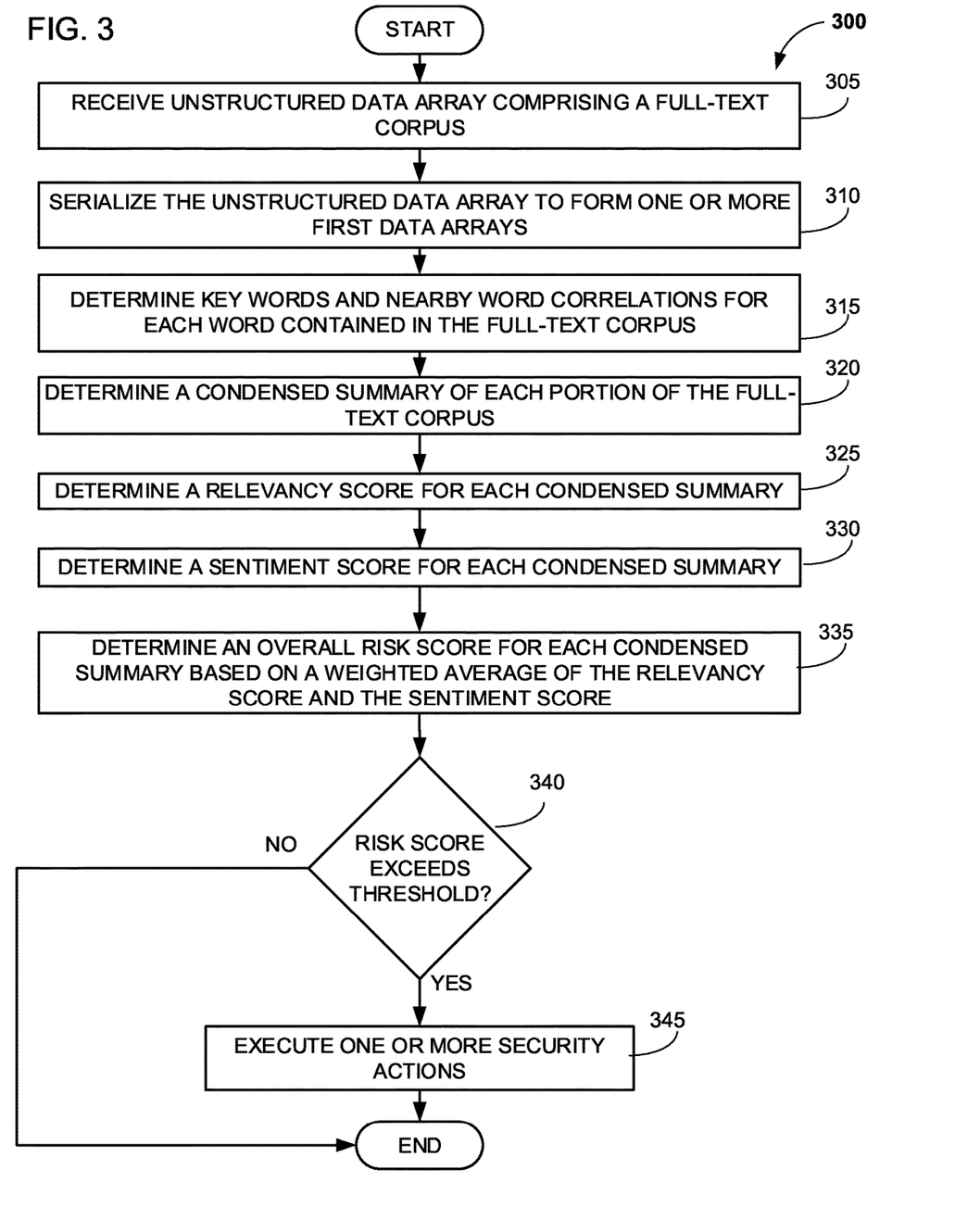
FIG. 3 is a flowchart of yet another exemplary method of dynamic detection of security features based on self-supervised natural language extraction from unstructured data sets, in accordance with some embodiments.

FIG. 3 is a flowchart of yet another exemplary method of dynamic detection of security features based on self-supervised natural language extraction from unstructured data sets, in accordance with some embodiments. As shown in FIG. 3, in step 305 of method 300, the system may receive a first unstructured data array. The first unstructured data array may include a full text corpus indicative of one or more financial asset narratives and one or more financial liability narratives associated with a user. For example, the full text corpus may be representative of a long form financial narrative that includes discrete user events associated with financial assets and financial liabilities that a financial service provider may need to analyze to determine a security score (e.g., a risk profile) associated with the user. In step 310, the system may serialize the first unstructured data array to form one or more first data arrays. For example, the system may utilize a pickling algorithm to segment an input stream contained within an unstructured data array (e.g., a long form financial narrative) into discrete financial events. For example, the pickling algorithm may include receiving the unstructured data, scrubbing the unstructured data to remove html tags, images, etc. to leave only raw text representative of long form financial risk narratives. A python pickling library may be utilized to serialize the unstructured data array into one or more first data arrays which may be stored as a .pkl file in some embodiments. In some embodiments, during the segmentation process, the system may identify a timestamp associated with each discrete portion of the input stream and form the one or more first data arrays based on segmenting the unstructured data array according to the identified timestamps. In step 315, the system may (e.g., via security assessment module 510) determine key words and nearby word correlations for each word of the full-text corpus. For example, determining key word and nearby word correlations may include determining which words of the input text of the financial narrative associated with the respective discrete user event convey the main theme or outcome of the discrete user event such that the system may determine which words to include in a condensed financial risk narrative. In step 320, the system may determine a condensed financial risk summary for each discrete financial event represented by the one or more first data arrays. For example, the condensed financial risk summaries may be determined using a pretrained BERT NLP language model, ELMO NLP language model, and/or GLOVE NLP language model in tandem with a self-supervised learning neural network. In step 325, the system may determine a relevancy score for each condensed summary. In some embodiments, the relevancy score may be determined in a similar way to determining security weight as described in more detail with respect to FIGS. 1-2. The relevancy score may indicate how pertinent a respective condensed financial risk summary is to an overall risk profile for a respective user. In step 330, the system may determine an associated sentiment score for each condensed summary. For example, the sentiment score may be a value between −1 and 1. A sentiment score of −1 may indicate the condensed financial risk summary has a strong negative impact, whereas a sentiment score of +1 indicates a strong positive impact, with values in between indicative of relatively less strong negative and/or positive impact, respectively. A sentiment score of 0 may indicate a neutral impact or no impact on a user's financial risk profile. In step 335, the system may calculate an overall risk score for each condensed financial risk summary. In some embodiments, the overall risk score may be computed based on a weighted average of the relevancy score and the sentiment score. In some embodiments, the overall risk score may be determined by multiplying the value of the relevancy score with the value of the sentiment score, such that the sentiment score indicates whether the event is correlated with positive or negative risk profiles and the relevancy score provides a metric for how impactful a respective condensed financial risk summary is to the user's financial risk profile. In decision block 340, the system may verify whether the determined risk score exceeds a predetermined threshold. When the risk score exceeds the predetermined threshold, the system may execute one or more security actions in step 345. According to some embodiments, the one or more security actions may include an action selected from flagging a user account for external review, generating a suggestion to lower a credit rating associated with the user account, and generating a suggestion for offering an alternative loan package. In some embodiments, the one or more security actions may include identifying whether market conditions have changed such that additional external review is not needed (e.g., when market conditions indicate that the predetermined threshold associated with the security score should be adjusted upwards, requiring a higher security score before one or more security actions are taken). In some embodiments, the one or more security actions may include identifying and reviewing at least one financial metric associated with the user account.

Figure 4:
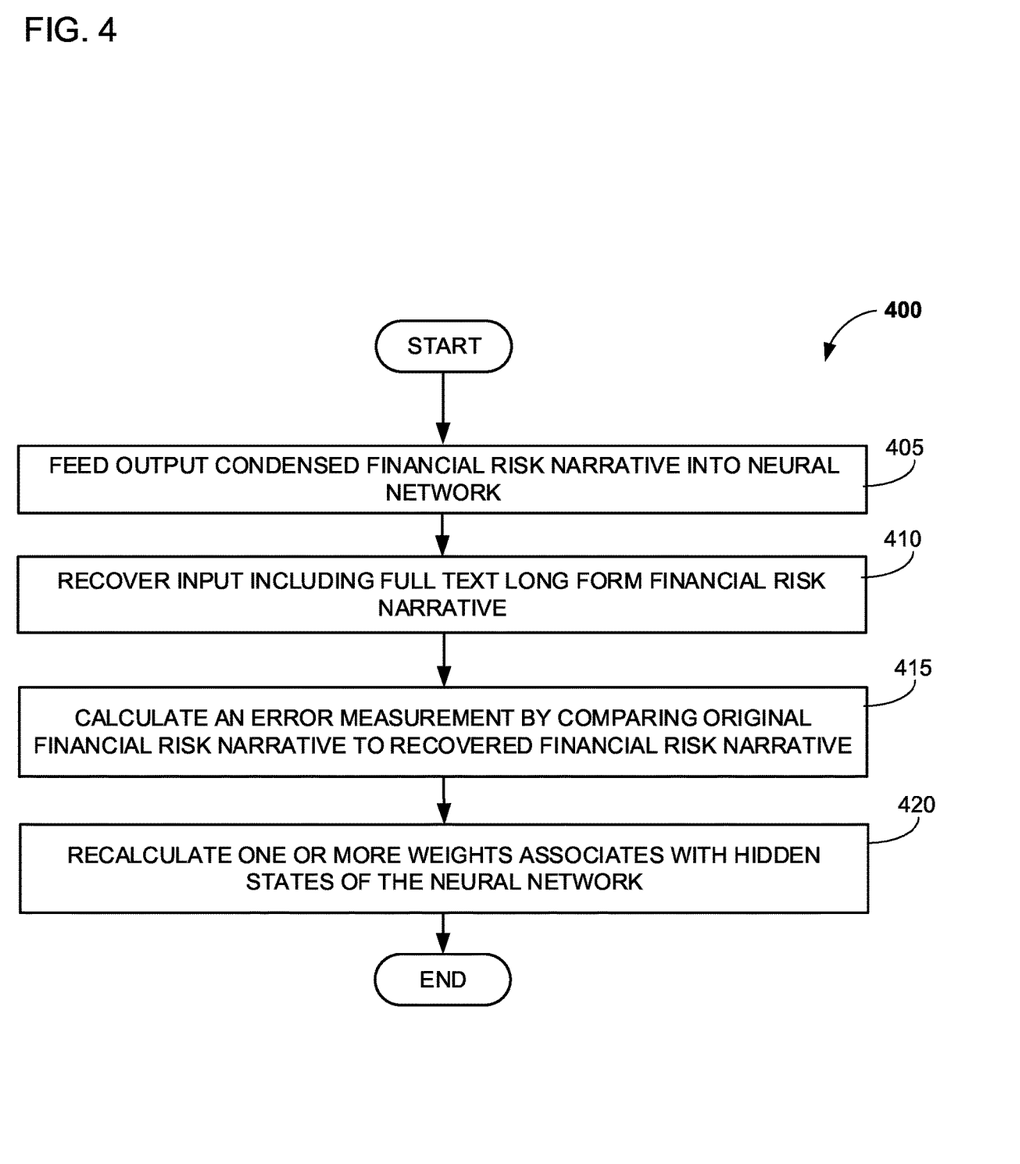
FIG. 4 is a flowchart of an exemplary method of iteratively improving the accuracy of the self-supervised natural language extraction process, in accordance with some embodiments.

FIG. 4 is a flowchart of an exemplary method of iteratively improving the accuracy of the self-supervised natural language extraction process, in accordance with some embodiments. As shown in FIG. 4, in step 405 of method 400, the system may utilize a neural network enabled machine learning process to recover the full text of the input stream based on using the resultant condensed financial risk summaries as an input to the neural network model. The system may feed an outputted condensed financial risk narrative back through the neural network and determine a reconstructed long form financial risk narrative. In step 410, the system may reconstruct the full text of the long form financial risk narrative. In step 415, the system may calculate an error measurement based on comparing the original long form financial risk narrative with the recovered financial risk narrative. In step 420, the system may recalculate one or more weights associated with hidden states of the neural network. Based on the updated weights, the system may utilize the updated neural network to redetermine the resultant condensed financial risk summaries. In some embodiments, the system may be configured to attempt reconstruction the full text corpus of the financial profile based on the generated condensed financial risk narrative and minimize an error associated with the reconstruction. By iteratively repeating the process of generating a condensed summary and reconstructing the full text corpus of the financial profile, the system may adjust weights associated with each connected layer of the neural network. In some embodiments, the neural network may be a bidirectional recurrent neural network (RNN).

Figure 5:
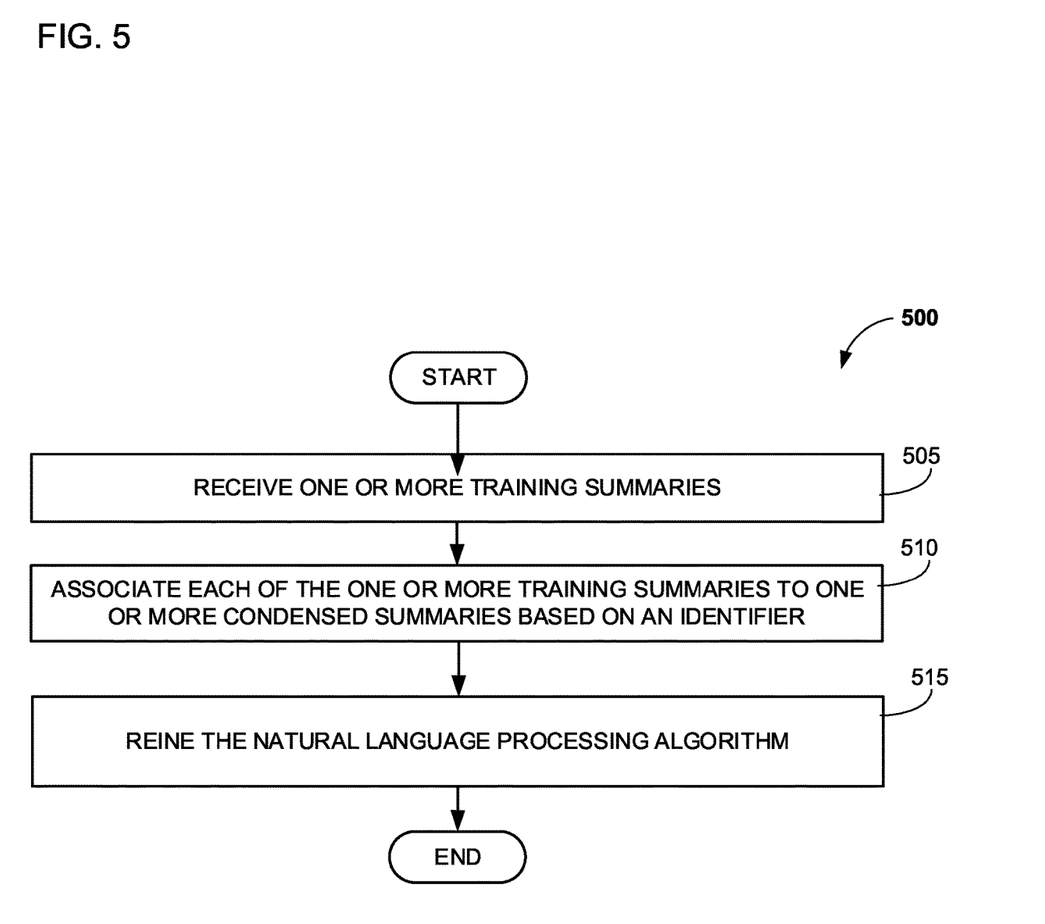
FIG. 5 is a flowchart of another exemplary method of improving the accuracy of the self-supervised natural language extraction process, in accordance with some embodiments.

FIG. 5 is a flowchart of another exemplary method of improving the accuracy of the self-supervised natural language extraction process, in accordance with some embodiments. As shown in FIG. 5, in step 505 of method 500, the system may receive one or more training summaries. For example, a financial service provider may have previously manually generated condensed financial risk summaries in the form of an annual report for a respective customer or user. In step 510, the system may associate each received training summary to one or more condensed summaries generated by the system (e.g., via security assessment module 610). For example, the system may identify which training summaries may correspond to a generated condensed summary by determining a common identifier for both the generated condensed summary and the training summary. In some embodiments, the common identifier may include a customer identifier, a timestamp, and a unique transaction identifier. When one or more of the customer identifier, the timestamp, and the unique transaction identifier match between a training summary and a generated condensed summary, the system may associate the training summary with the generated condensed summary. In step 515, the system may refine the natural language processing algorithm. For example, the system may calculate an error measurement representative of the aggregate differences between the generated condensed summary and the training summary. Based on the results of the comparison, the system may adjust one or more weights of the neural network and iteratively redetermine the condensed summaries to more closely align with the training summaries.

Figure 6:
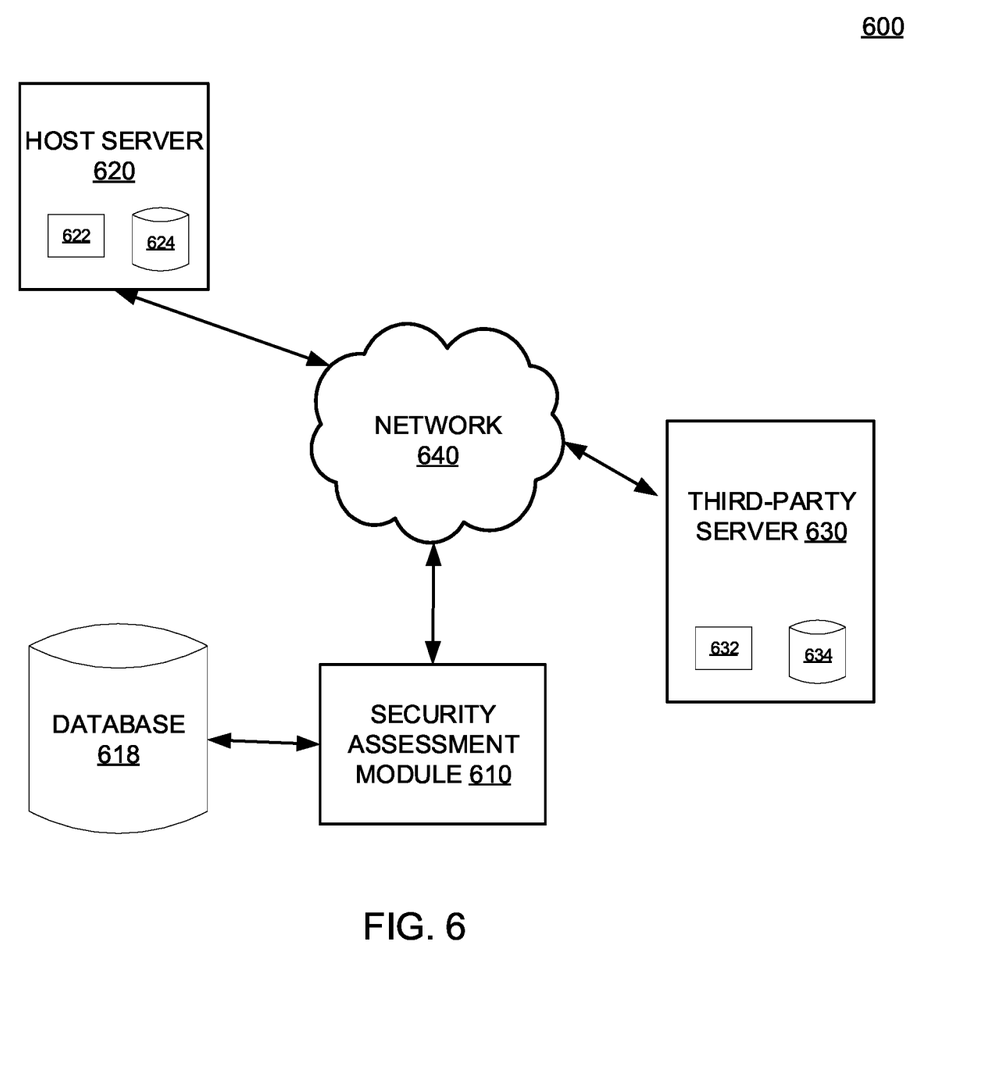
FIG. 6 is a diagram of an exemplary system that may be used for dynamic detection of security features based on self-supervised natural language extraction from unstructured data sets, in accordance with some embodiments.

FIG. 6 shows a diagram of an exemplary system that may be configured to perform one or more software processes that, when executed, performs steps of methods consistent with the embodiments disclosed herein. The components and arrangements shown in FIG. 5 are not intended to limit the disclosed embodiments as the components used to implement the disclosed processes and features may vary.

In accordance with disclosed embodiments system 600 may include a security assessment module device 610, a host server 620, and a third-party server 630 each communicating over a network 630. According to some embodiments, the host server 620 may be operated by a financial service provider and may store long form financial risk narratives associated with users or customers of the financial service provider. Similarly, in some embodiments, long form financial risk narratives may be stored by a third-party, using third party server 630. However, in some embodiments, the security assessment module may include a database 618 on which the long form financial risk narratives are already stored. Both the host server 620 and the third-party server 630 may be connected to the security assessment module either directly or over the network 640. Other components known to one of ordinary skill in the art may be included in system 600 to process, transmit, provide, and receive information consistent with the disclosed embodiments.

The security assessment module 610 may be a computer-based system. For example, the security assessment module 610 may include a general purpose or notebook computer, a mobile device with computing ability, a server, a desktop computer, tablet, or any combination of these computers and/or affiliated components. The security assessment module 610 may include one or more sensors such as a camera and microphone (i.e., audiovisual monitoring systems), gyroscope and/or a GPS receiver. The security assessment module 610 may be configured with storage that stores one or more operating systems that perform known operating system functions when executing by one or more processors. For example, the operating systems may include Microsoft Windows™, Unix™, Linux™, Apple™ operating systems, Personal Digital Assistant (PDA) type operating systems (e.g. Microsoft CE.TM), or other types of operating systems, nonexclusively. Further, the security assessment module 610 may include communication software that, when executed by a processor, provides communications with the network 640, such as web browser software, tablet, or smart handheld device networking software, etc. The security assessment module 610 may be a device that executes mobile applications, such as a tablet or a mobile device. Although reference is made specifically to the security assessment module 610, a person of ordinary skill in the art would understand that the host server 620 and the third-party server 630 may have some or all of the components and capabilities of the security assessment module 610.

The host server 620 may allow a financial service provider, such as a bank, a credit card company, a merchant, a lender, etc., to offer and provide a secure storage server to store long form financial risk narratives associated with customers or users of the system. The host server may further include one or more processors 622 and one or more web server databases 624, which may be any repository suitable for storage of long form financial risk narratives. The host server 620 may be a may be a computer-based system including computer system components, such as one or more servers, desktop computers, workstations, tablets, handheld computing devices, memory devices, and/or internal network(s) connecting the components. The third-party 630 may similarly be controlled by a third-party financial service provider, a bank, a credit card company, a merchant, a lender, etc., to provide a secure storage for storing long form financial risk narratives associated with customers or users of the system. The third-party server may include one or more processors 632 and one or more web server databases 634, which may provide some or all of the functions described with respect to the host server 620.

Network 640 may comprise any type of computer networking arrangement used to exchange data. For example, network 640 may be the Internet, a private data network, or a virtual private network using a public network such as the Internet. Network 640 may also include a public switched telephone network ("PSTN") and/or a wireless network.

Figure 7:
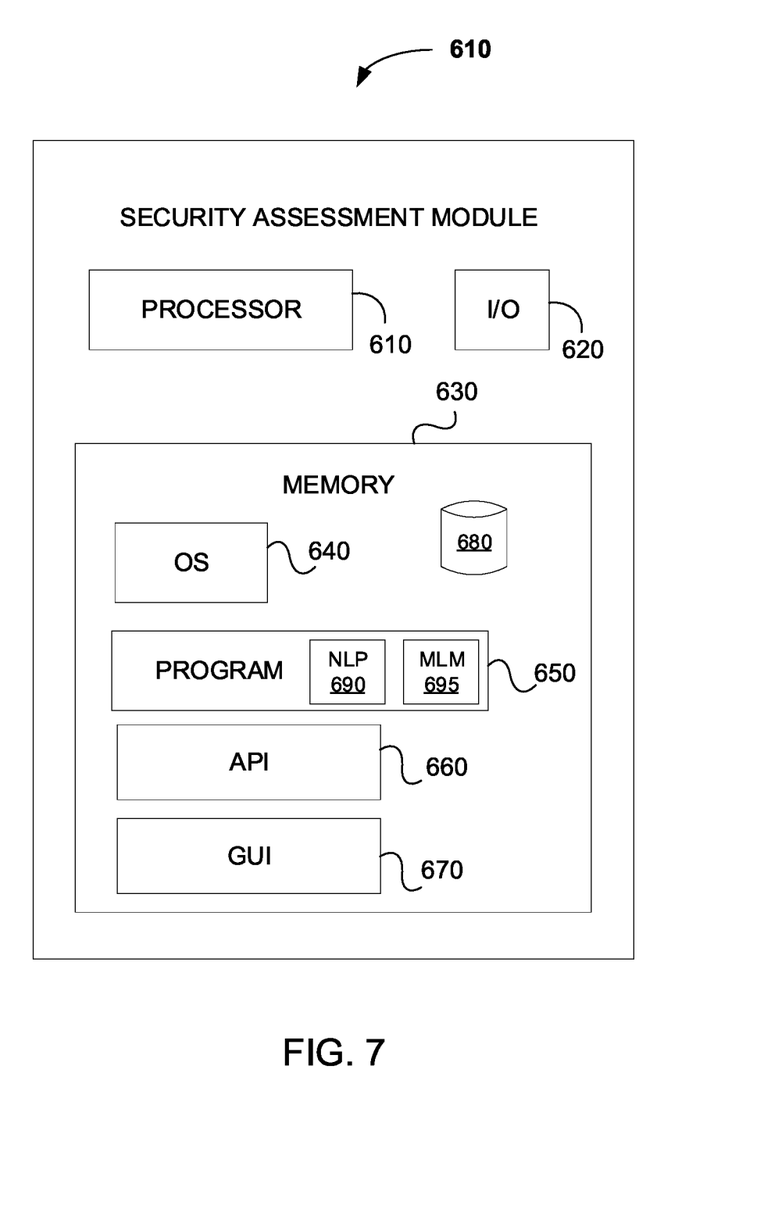
FIG. 7 is a component diagram of an exemplary security assessment module for dynamic detection of security features based on self-supervised natural language extraction from unstructured data sets, according to some embodiments.

FIG. 7 is a block diagram (with additional details) of the example security assessment module 610, as also depicted in FIG. 6. According to some embodiments, the host server 620, and the third-party server 630, as depicted in FIG. 6, may have a similar structure and components that are similar to those described with respect to security assessment module 610 shown in FIG. 7. As shown, the security assessment module 610 may include a processor 610, an input/output ("I/O") device 620, a memory 630 containing an operating system ("OS") 640 and a program 650. In certain example implementations, the security assessment module 610 may be a single server or may be configured as a distributed computer system including multiple servers or computers that interoperate to perform one or more of the processes and functionalities associated with the disclosed embodiments. In some embodiments, the security assessment module 610 may further include a peripheral interface, a transceiver, a mobile network interface in communication with the processor 610, a bus configured to facilitate communication between the various components of the security assessment module 610, and a power source configured to power one or more components of the security assessment module 610.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 610 to communicate with other devices via wired or wireless networks, whether local or wide area, private or public, as known in the art. A power source may be configured to provide an appropriate alternating current (AC) or direct current (DC) to power components.

The processor 610 may include one or more of a microprocessor, microcontroller, digital signal processor, co-processor or the like or combinations thereof capable of executing stored instructions and operating upon stored data. The memory 630 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 630.

The processor 610 may be one or more known processing devices, such as, but not limited to, a microprocessor from the Pentium™ family manufactured by Intel™ or the Turion™ family manufactured by AMD™. The processor 610 may constitute a single core or multiple core processor that executes parallel processes simultaneously. For example, the processor 610 may be a single core processor that is configured with virtual processing technologies. In certain embodiments, the processor 610 may use logical processors to simultaneously execute and control multiple processes. The processor 610 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the security assessment module 610 may include one or more storage devices configured to store information used by the processor 610 (or other components) to perform certain functions related to the disclosed embodiments. In one example, the security assessment module 610 may include the memory 630 that includes instructions to enable the processor 610 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, the security assessment module 610 may include a memory 630 that includes instructions that, when executed by the processor 610, perform one or more processes consistent with the functionalities disclosed herein. Methods, systems, and articles of manufacture consistent with disclosed embodiments are not limited to separate programs or computers configured to perform dedicated tasks. For example, the security assessment module 610 may include memory 630 that may include one or more programs 650 to perform one or more functions of the disclosed embodiments. For example, in some embodiments, the security assessment module 610 may additionally operate a self-supervised neural network for natural language extraction from long form narratives associated with a user via a program 650.

In certain example implementations, the program 650 that may include a natural language processing platform 690 for generating condensed financial risk summaries based on a long form financial risk narrative in accordance with a self-supervised neural network configured to generate condensed financial risk summaries. In some embodiments, the security assessment module 610 may include a trained machine learning model 695 for iteratively improving the quality and accuracy of the generated condensed financial risk narratives by adjusting one or more weights of hidden layers of a neural network.

The memory 630 may include one or more memory devices that store data and instructions used to perform one or more features of the disclosed embodiments. The memory 630 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 630 may include software components that, when executed by the processor 610, perform one or more processes consistent with the disclosed embodiments. In some embodiments, the memory 630 may include a user information database 680 for directly storing long form financial risk narratives associated with a respective user or customer to enable the security assessment module 610 to perform one or more of the processes and functionalities associated with the disclosed embodiments.

The user information database 680 may include stored data relating to a user or customer profile and user or customer accounts, such as for example, user identification, name, age, sex, birthday, address, account status, preferences, preferred language, greeting name, preferred communication channel, account numbers, order history, delivery history, authorized users associated with one or more accounts, account balances, account payment history, and other such typical account information. The user information database 680 may further include stored data relating to previous interactions between the organization (or its related entity) and a user. For example, the user information database 280 may store long form financial risk narratives that may include stored data as identified above. The user information database 680 may also include information about business transactions between an organization (or a related entity) and a user or customer that may be obtained from, for example, the host server 620 and/or third-party server 630.

The user information database 680 may also include semantic data indicative of whether a respective financial event positively or negatively affects a user's overall risk profile. According to some embodiments, the system may extract semantic meaning from a long form financial risk narrative to determine whether discrete user events associated with financial assets narratives and/or financial risk narratives positively or negatively impact a user's financial risk profile. According to some embodiments, the functions provided by the user information database 680 may also be provided by a database that is external to the security assessment module 610, such as database 618 as shown in FIG. 6.

Exemplary Use Cases

The following exemplary use case describes an example of a typical user flow pattern. It is intended solely for explanatory purposes and not in limitation. Financial service providers are continuously receiving financial information stored as long form financial narratives that the financial service providers must analyze for each customer wishing to receive financial service or to continue receiving existing financial services from the financial service provider. Typically, financial service providers have to manually review an aggregation of numerous long form financial narratives to develop summaries of the most relevant financial information in an annual review. Financial service providers may use an annual review process in order to determine whether to continue offering a financial service or product to a customer, discontinue the financial service or product, or change one or more financial terms (e.g., interest rate) of the financial service or product being offered.

Certain example implementations of the disclosed technology provide technological improvements in automating the annual financial review process by utilizing a self-supervised natural language model to autonomously create condensed financial risk narratives and generate an annual review report without human supervision.

In one exemplary use case according to some embodiments, the system may be utilized to autonomously generate an annual report that includes condensed financial risk narratives used by a financial service provider to determine whether to continue offering a financial service or product to the customer, change one or more terms of the financial service or product, or discontinue the financial service or product. The system may receive an unstructured data set including numerous long form financial narratives including financial information about the respective customer. The system may analyze the received data set to determine an identifier (e.g., a timestamp) associated with certain portions of the unstructured data set. For example, the system may determine that the unstructured data set consists of 100 discrete financial narratives, and may serialize the 100 discrete financial narratives by date according to an identified timestamp associated with each discrete financial narrative. The system may employ a neural network model to determine key words and word to word correlations within each discrete financial narrative, and may determine a condensed summary for each discrete financial narrative. The system may assign each condensed summary a relevancy score indicative of how likely a respective summary will have an effect on a customer's ability to maintain a financial service or product. Further, the system may determine a sentiment score for each condensed summary. The sentiment score may be a value between −1 and 1, with a negative number indicating a negative impact to a customer's financial risk profile, and a positive number indicating a positive impact to a customer's financial risk profile. The system may calculate an overall risk score based on the product of the sentiment score and the relevancy score. When the overall risk score of any condensed summaries exceeds a predetermined threshold, the system may execute one or more security actions. In some embodiments the one or more security actions include flagging a customer's financial profile for review. In some embodiments, the system executes one or more security actions in response to an aggregate overall risk score (e.g., sum of the overall risk scores of each condensed summary) exceeding a predetermined threshold.

Examples of the present disclosure relate to systems and methods for dynamic detection of security features based on self-supervised natural language extraction from unstructured data sets. In one aspect, a system for dynamic detection of security features based on self-supervised natural language extraction from unstructured data sets is disclosed. The system may implement a method according to the disclosed embodiments. The system may receive a first unstructured data array indicative of a plurality of discrete user events. The system may serialize the unstructured data array based on at least one indicator to form one or more first data arrays. The one or more first data arrays may each be indicative of discrete user event. The system may determine a vector representation and correlation value for each data entry pair of the one or more first data arrays. The system may generate a value for each data entry of the one or more first data arrays based on the determined vector representations and correlation values. The system may determine one or more second data arrays based on selecting a plurality of highest value data entries from the one or more first data arrays. For each discrete user event, the system may compute a security weight based on the one or more second data arrays, compute an associated sentiment score for each security weight, and compute a security score based on a weighted average of the sentiment score and the security weight. When the security score of any discrete user event exceeds a predetermined threshold, the system may execute one or more security actions.

In some embodiments, the vector representation and correlation value may be determined based on applying natural language processing to each data entry of the one or more first data arrays.

In some embodiments, the security weight of each discrete user event is based on the at least one indicator associated with a respective discrete user event. In some embodiments, the at least one indicator may further include a timestamp associated with the respective discrete user event. In some embodiments, the security score is indicative of a hazard associated with the discrete user event. In some embodiments, the one or more security actions may further include generating an indication of a user associated with the discrete user events having a security score exceeding the predetermined threshold.

In another aspect, a method for dynamic detection of security features based on self-supervised natural language extraction from unstructured data sets is disclosed. The method may include receiving a first unstructured data array indicative of a plurality of first discrete user events. The method may include serializing the unstructured data array based on at least one indicator to form one or more first data arrays. The one or more first data arrays may each be indicative of a discrete user event. For each data entry of the one or more first data arrays, the method may include determining a tokenization library. The method may include generating a value for each data entry of the one or more first data arrays based on the determined tokenization library. The method may include determining one or more second data arrays based on selecting a plurality of highest value data entries from the one or more first data arrays. For each discrete user event, the method may include computing a security weight based on the one or more second data arrays, computing an associated sentiment score for each security weight, and computing a security score based on a weighted average of the sentiment score and the security weight. When the security score of any discrete user event exceeds a predetermined threshold, the method may include executing one or more security actions.

In some embodiments, the tokenization library is determined based on applying natural language processing to each data entry of the one or more first data arrays. In some embodiments, the security weight of each discrete user event is based on the at least one indicator associated with a respective discrete user event. In some embodiments, the at least one indicator further includes a timestamp associated with the respective discrete user event. In some embodiments, the security score is indicative of a financial risk associated with the discrete user event. In some embodiments, the one or more security actions further include generating a notification indicating a user having an elevated risk profile.

In another aspect, a system for dynamic detection of security features based on self-supervised natural language extraction from unstructured data sets is disclosed. The system may receive a first unstructured data array. The first unstructured data array may include a full-text corpus indicative of one or more financial assets narratives and one or more financial liabilities narratives associated with a user. The system may serialize the first unstructured data array. The first unstructured data array may be serialized based on a pickling algorithm to form one or more first data arrays. Each first data array may be indicative of a portion of the full-text corpus. Each portion of the full-text corpus may be indicative of financial assets or a financial liability narrative and may include an associated timestamp. The system may apply a self-tokenization aspect of a natural language processing algorithm to determine key words and nearby word correlations for each word contained in the full-text corpus. The system may determine a condensed summary of each portion of the full-text corpus. The condensed summary may be determined using a self-supervised machine learning aspect of the natural language processing algorithm. The system may determine a relevancy score for each condensed summary based at least in part on the associated timestamp. The system may determine, using a sentiment analysis aspect of the natural language processing algorithm, a sentiment score for each condensed summary. The system may determine an overall risk score for each condensed summary based on a weighted average of the relevancy score and the sentiment score. When the at least overall risk score exceeds a predetermined threshold, the system may execute one or more security actions.

In some embodiments, the system may refine the natural processing algorithm based on comparing one or more of the condensed summaries to one or more training summaries. In some embodiments, a higher relevancy score is assigned to a respective condensed summary based at least in part on the associated timestamp indicating a more recent narrative. In some embodiments, the one or more security actions include at least one action selected from flagging a user account for external review, generating a suggestion to lower a credit rating associated with the user account, and generating a suggestion for offering an alternative loan package.

In some embodiments, the sentiment analysis aspect further includes defining a plurality of sentiment tiers and assigning each condensed summary to a respective sentiment tier. In some embodiments, the overall risk score is indicative of a likelihood that the user may default on a loan package. In some embodiments, the system may be further configured to scrub the first unstructured data array by removing data entries not associated with raw text data before serializing the first unstructured data array. In some embodiments, the system may be further configured to autonomously generate an annual review based on an aggregation of each condensed summary.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described herein with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described herein with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A system for dynamic detection of security features based on self-supervised natural language extraction from unstructured data sets, comprising:
    one or more processors;
    a memory in communication with the one or more processors and storing instructions that, when executed by the processor, are configured to cause the system to:
    retrieve a first unstructured data array indicative of a plurality of discrete user events, wherein retrieving the first unstructured data array comprises retrieving the first unstructured data array from a database;
    converting the unstructured data array by serializing the unstructured data array based on at least one indicator to form one or more first data arrays, the one or more first data arrays each indicative of a discrete user event;
    for each data entry pair of the one or more first data arrays, determine a vector representation and correlation value using a neural network implemented by the one or more processors;
    generate a value for each data entry of the one or more first data arrays based on the determined vector representations and correlation values, wherein the value for each data entry is determined at least in part by accessing the database to find the respective discrete user event for each data entry to determine whether the value represents a desired event with a positive value or a hazardous event with a negative value;
    determine one or more second data arrays corresponding to a subset of the one or more first data arrays based on selecting a plurality of highest value data entries from the one or more first data arrays using the neural network, wherein selecting the plurality of highest value data entries includes dynamically generating narratives associated with each respective discrete user event of the one or more first data arrays and storing the narratives as the one or more second data arrays in the database;
    determine a security weight for each discrete user event based on the one or more second data arrays and the at least one indicator associated with a respective discrete user event, the at least one indicator comprising a timestamp;
    determine an associated sentiment score for each security weight;
    determine a security score based on a weighted average of the sentiment score and the security weight;
    when the security score of any discrete user event exceeds a predetermined threshold, execute one or more security actions, wherein at least one of the one or more security actions comprises generating an indication that the security score of a user account associated with the discrete user events exceeds the predetermined threshold;
    compute one or more third data arrays from the one or more second data arrays using the neural network by providing the one or more second data arrays as input to the neural network;
    iteratively calculate an error measurement between the one or more third data arrays and the one or more first data arrays; and
    iteratively modify one or more weights of one or more layers of the neural network based on the calculated error measurement.

2. The system of claim 1, wherein the neural network further comprises a bidirectional recurrent neural network.

3. The system of claim 1, wherein the security score is indicative of a hazard associated with the discrete user event.

4. A method for dynamic detection of security features based on self-supervised natural language extraction from unstructured data sets, comprising:
    retrieving a first unstructured data array indicative of a plurality of first discrete user events, wherein retrieving the first unstructured data array comprises retrieving the first unstructured data array from a database;
    converting the unstructured data array by serializing the unstructured data array based on at least one indicator to form one or more first data arrays, the one or more first data arrays each indicative of a discrete user event;
    for each data entry of the one or more first data arrays, determining a tokenization library using a neural network implemented by one or more processors;
    generating a value for each data entry of the one or more first data arrays based on the determined tokenization library, wherein the value for each data entry is also determined at least in part by accessing the database to find the respective first discrete user event for each data entry to determine whether the value represents a desired event with a positive value or a hazardous event with a negative value;
    determining one or more second data arrays corresponding to a subset of the one or more first data arrays based on selecting a plurality of highest value data entries from the one or more first data arrays using the neural network, wherein selecting the plurality of highest value data entries includes dynamically generating narratives associated with each respective first discrete user event of the one or more first data arrays and storing the narratives as the one or more second data arrays in the database;
    determining a security weight for each discrete user event based on the one or more second data arrays and the at least one indicator associated with a respective discrete user event, the at least one indicator comprising a timestamp;
    determining an associated sentiment score for each security weight;

determining a security score based on a weighted average of the sentiment score and the security weight;

when the security score of any discrete user event exceeds a predetermined threshold, executing one or more security actions, wherein at least one of the one or more security actions comprises generating an indication that the security score of a user account associated with the discrete user events exceeds the predetermined threshold;

computing one or more third data arrays from the one or more second data arrays using the neural network by providing the one or more second data arrays as input to the neural network;

iteratively calculating an error measurement between the one or more third data arrays and the one or more first data arrays; and iteratively modifying one or more weights of one or more layers of the neural network based on the calculated error measurement.

5. The method of claim 4, wherein the neural network further comprises a bidirectional recurrent neural network.

6. The method of claim 4, wherein the security score is indicative of a financial risk associated with the discrete user event.

7. The method of claim 6, wherein the one or more security actions further comprise generating a notification indicating a user having an elevated risk profile.

8. A system for dynamic detection of security features based on self-supervised natural language extraction from unstructured data sets, comprising:
   one or more processors;
   a memory in communication with the one or more processors and storing instructions that, when executed by the processor, are configured to cause the system to:
   retrieve a first unstructured data array comprising a full-text corpus indicative of one or more financial assets narratives and one or more financial liabilities narratives associated with a user, wherein retrieving the first unstructured data array comprises retrieving the first unstructured data array from a database;
   serialize the first unstructured data array based on a pickling algorithm to form one or more first data arrays each indicative of a portion of the full-text corpus, wherein each portion is indicative of a financial assets or a financial liability narrative and includes an associated timestamp, wherein the portions of the narrative are classified as financial assets or financial liabilities at least in part by accessing a user information database which includes semantic data indicative of whether a financial event in the full-text corpus is a desired positive event or a hazardous negative event;
   apply a self-tokenization aspect of a natural language processing algorithm to determine key words and nearby word correlations for each word contained in the full-text corpus using a neural network implemented by the one or more processors, wherein determining key words and nearby word correlations includes determining which words of the full-text corpus convey an outcome of the one or more financial assets narratives or one or more financial liabilities narratives, wherein the one or more financial assets narratives and the one or more financial liabilities narratives are stored in the database;
   determine, using a self-supervised machine learning aspect of the natural language processing algorithm, a condensed summary of each portion of the full-text corpus corresponding to a subset of the one or more first data arrays;
   determine a relevancy score for each condensed summary based at least in part on the associated timestamp;
   determine, using a sentiment analysis aspect of the natural language processing algorithm, a sentiment score for each condensed summary;
   determine an overall risk score for each condensed summary based on a weighted average of the relevancy score and the sentiment score;
   when at least one overall risk score exceeds a predetermined threshold, execute one or more security actions, wherein the one or more security actions comprise at least flagging a user account for external review;
   generate a reconstructed full-text corpus by providing the condensed summaries of each portion of the full-text corpus as input to the neural network;
   iteratively calculate an error measurement between the reconstructed full-text corpus and the full-text corpus; and
   iteratively modify one or more weights of one or more layers of the neural network based on the calculated error measurement.

9. The system of claim 8, wherein the neural network further comprises a bidirectional recurrent neural network.

10. The system of claim 8, wherein the one or more security actions further comprise at least an action selected from generating a suggestion to lower a credit rating associated with the user account and generating a suggestion for offering an alternative loan package.

11. The system of claim 8, wherein the sentiment analysis aspect further comprises defining a plurality of sentiment tiers and assigning each condensed summary to a respective sentiment tier.

12. The system of claim 8, wherein the overall risk score is indicative of a likelihood that the user may default on a loan package.

13. The system of claim 8, wherein the instructions, when executed by the one or more processors, are further configured to cause the system to scrub the first unstructured data array by removing data entries not associated with raw text data before serializing the first unstructured data array.

14. The system of claim 8, wherein the instructions, when executed by the one or more processors, are further configured to cause the system to autonomously generate an annual review based on an aggregation of each condensed summary.

* * * * *